Nov. 24, 1970    E. F. BRINKER ET AL    3,543,007
AUTOMATIC CAR IDENTIFICATION SYSTEM
Filed Oct. 10, 1962    9 Sheets-Sheet 1

INVENTORS
Emil F. Brinker, Walter W. Sanville
and Thomas J. Blocher Jr.
BY
W. L. Stout
THEIR    ATTORNEY Nov. 24, 1970   E. F. BRINKER ET AL   3,543,007
AUTOMATIC CAR IDENTIFICATION SYSTEM
Filed Oct. 10, 1962   9 Sheets-Sheet 2
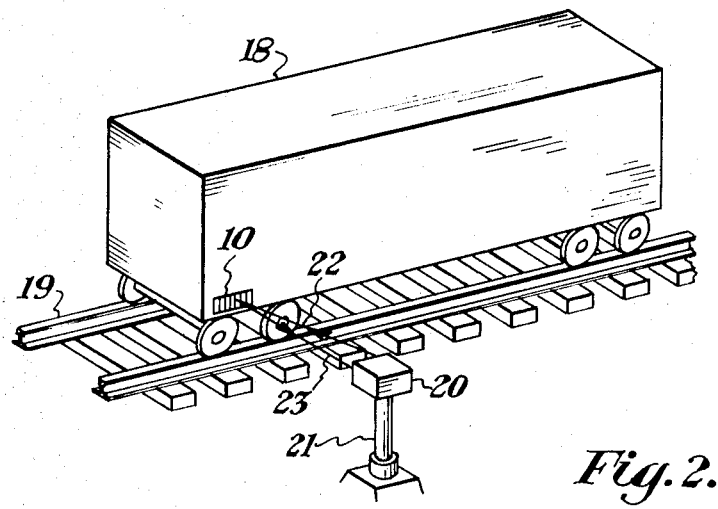
Fig.2.
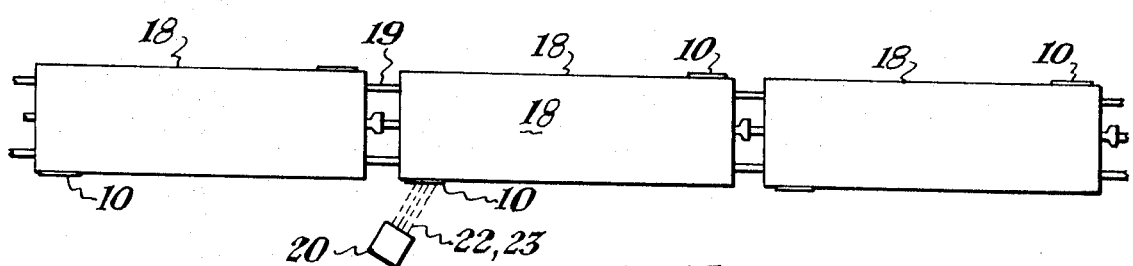
Fig.3.
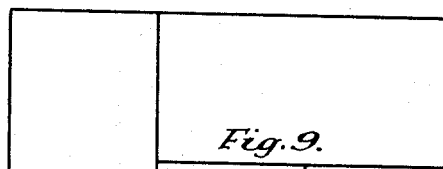
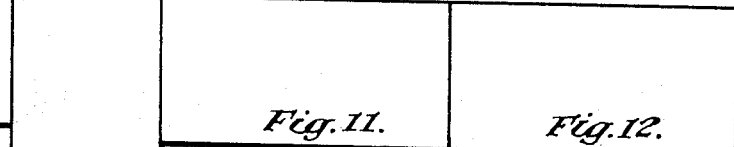
INVENTORS
Emil F. Brinker, Walter W. Sanville
and Thomas J. Blocher Jr.
BY
W. L. Stout
THEIR ATTORNEY INVENTORS
Emil F. Brinker, Walter W. Sanville
and Thomas J. Blocher Jr.
BY W. L. Stout
THEIR ATTORNEY

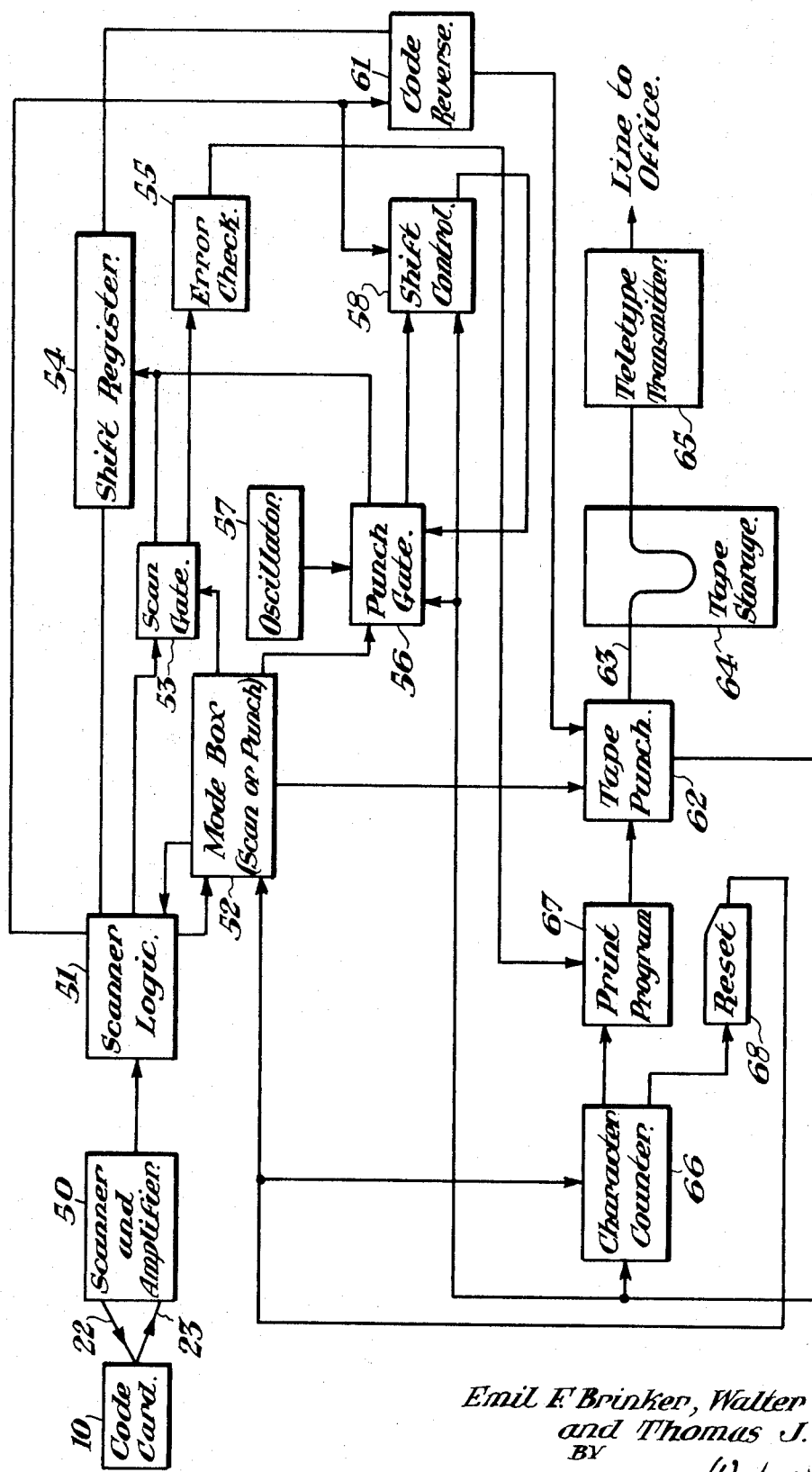

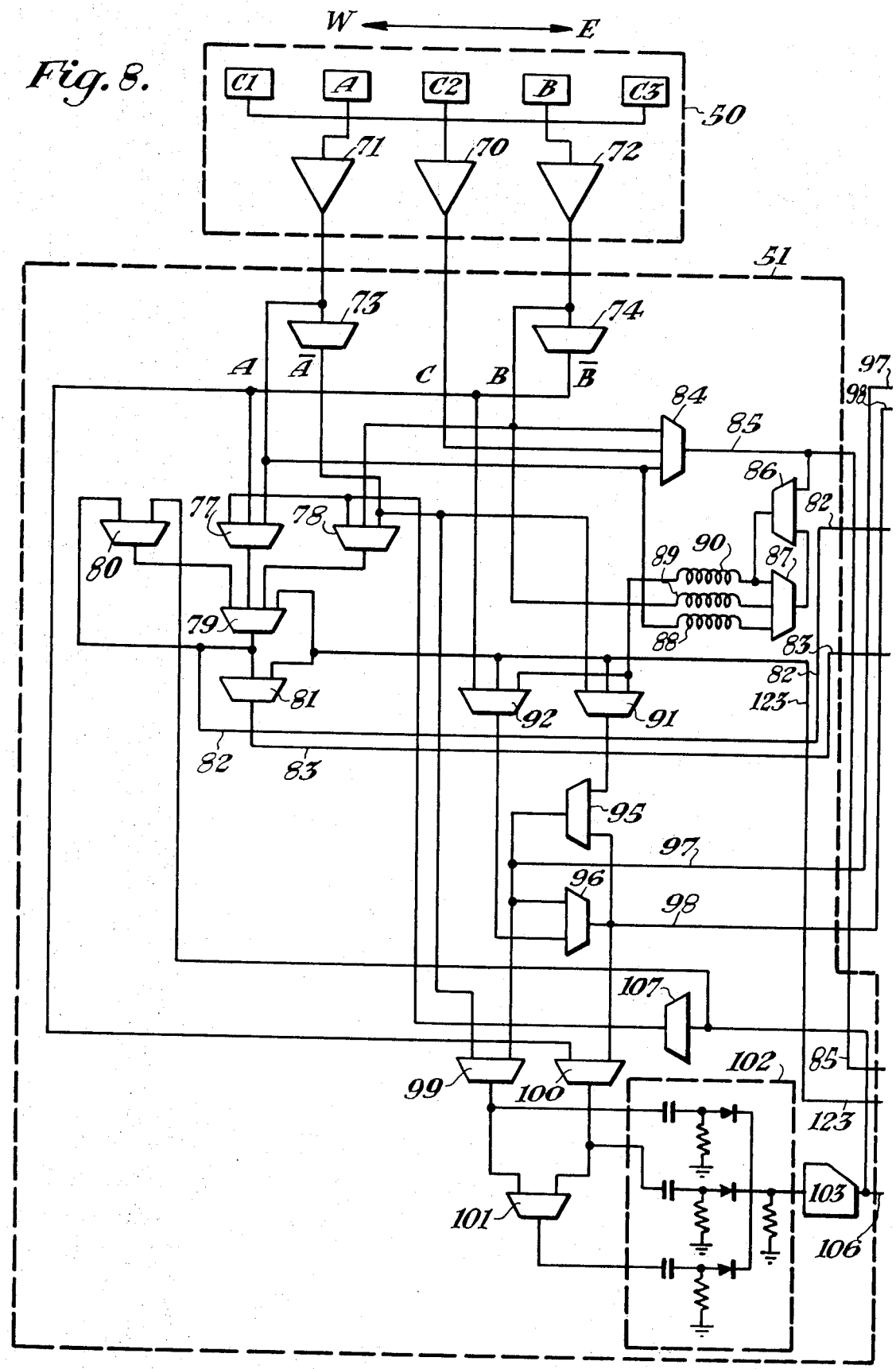

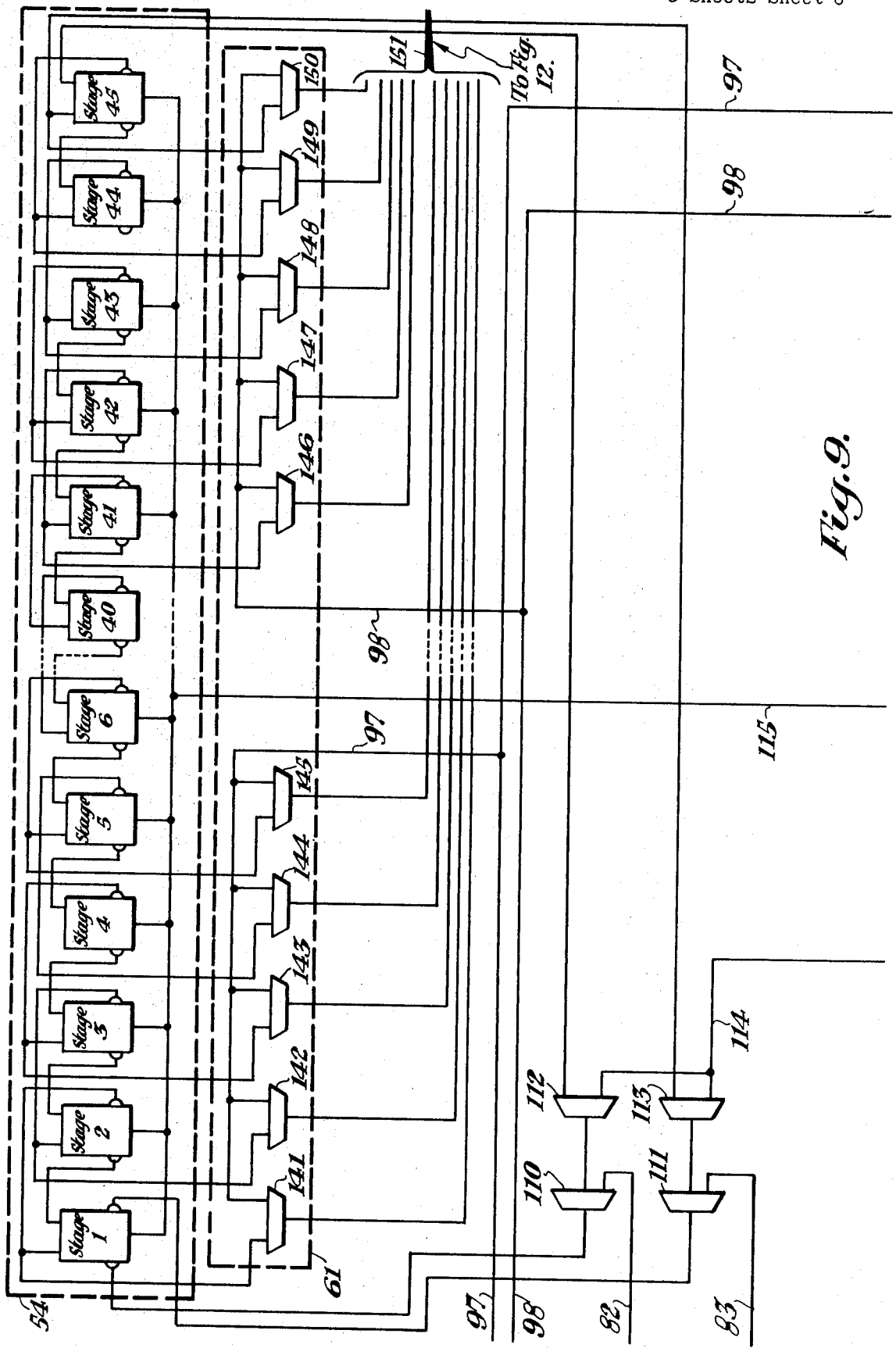

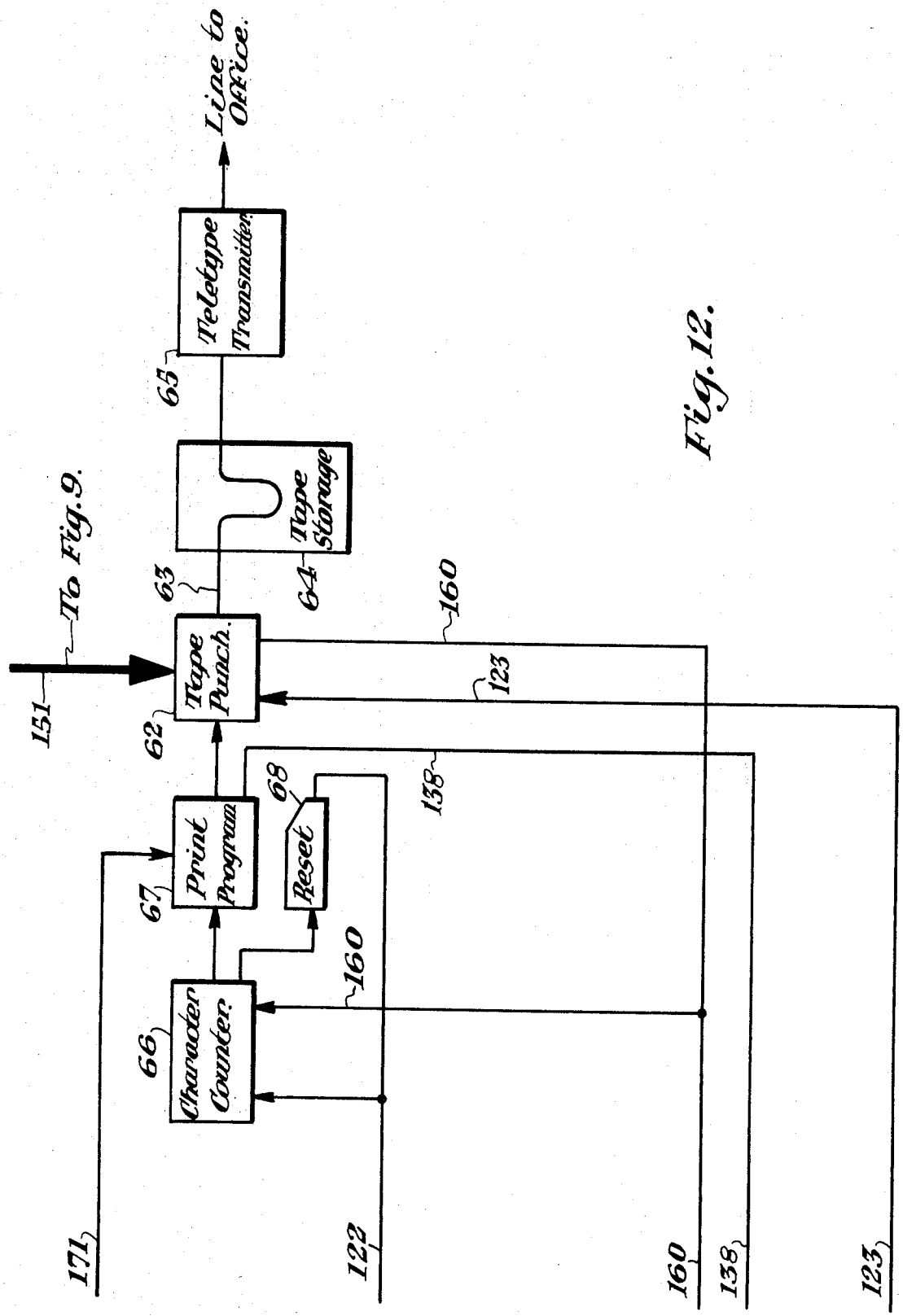

United States Patent Office 3,543,007
Patented Nov. 24, 1970

3,543,007
AUTOMATIC CAR IDENTIFICATION SYSTEM
Emil F. Brinker, Blackridge, and Walter W. Sanville, East mont, Pa., and Thomas J. Blocher, Jr., Houston, Tex., assignors to Westinghouse Air Brake Company, Swissvale, Pa., a corporation of Pennsylvania
Filed Oct. 10, 1962, Ser. No. 229,618
Int. Cl. B61i 27/00; G06k 7/00
U.S. Cl. 235—61.11     4 Claims

ABSTRACT OF THE DISCLOSURE

A system for identifying a moving railway vehicle upon which is fastened an identification member having alternate reflective and nonreflective areas, the width of each of the areas representing a bit of information. A wayside reader responsive to radiant energy reflected by the member provides signals which are applied to circuits for determining both identification and direction of the vehicle.

---

This invention relates to a system for identifying moving objects and more particularly to a system for automatically identifying moving railway vehicles as they pass a wayside point.

The invention was developed for and finds particular utility in identifying moving railway vehicles passing a wayside point, although the invention is not limited to this particular use and can be readily adapted to identify other forms of moving objects passing a wayside point.

With the high degree of automation currently being practiced in the railway industry, there has long been a need for a system for automatically identifying the cars in a train while the train is moving. For example, such a system would find particular utility in identifying the cars in a train approaching a classification yard or in conjunction with an automatic hot box detector. In addition, as is well known, railway cars frequently leave their home lines and spend periods of time in use on other railway lines. During the times that such vehicles are on other lines, they are subject to a per diem charge. The accounting operations necessary to compute and charge these per diem charges could be greatly simplified if such an automatic car identification system could be used.

The prior art disloses a number of arrangements for automatically identifying moving railway vehicles, but these prior art devices have suffered from one of two fatal defects, these being that the devices are either unreliable or too expensive. As a result, vehicle identification has been accomplished by manual inspection, which is time consuming, expensive, and in adverse weather, inaccurate.

Because there are approximately 2,000,000 railway vehicles in use in the United States and Canada, and because it would be necessary to equip a substantial majority of these vehicles with a consistent identifying device before such a system would be of particular utility, it is necessary that the cost of the apparatus which must be attached to the railway vehicles themselves be held to an absolute minimum. For example, a recent committee report of the Railroad Action Group recommended that the cost of equipment necessary to be attached to each railway vehicle in an automatic car identification system be limited to not more than $5.00 per vehicle. Also, in order to minimize the cost of the necessary communication equipment in such a system, the committee recommended that the system be compatible with standard Teletype equipment now in use so that this equipment could be used to communicate information from the automatic car identification system to a central office which utilize the information.

In one prior art system, it is proposed that each railway vehicle be equipped with a radio transmitter for transmitting a particular code signal which identifies the particular railway vehicle carrying the transmitter. The transmissions are then received by a receiver positioned at a wayside location and the individual vehicles in a train passing the receiver are thus identified. With the use of solid state circuits, transmitters can now be made suitably rugged to withstand the vibrations of railway vehicles so as to maintain reliable operation. However, the cost of equipping each of the several million railway vehicles with such a transmitter is prohibitively expensive, and thus, this type of prior art system is impractical.

In another prior art system, it is proposed to magnetize a portion of the truck of a railway vehicle in a predetermined polarity scheme to identify the particular vehicle. In practice, this scheme has proven impractical for two reasons, the first being that the continuous pounding to which the railway vehicles are subject results in an alignment of the dipoles in the iron of the vehicle and the creation of magnetic regions having a much stronger intensity than that of the coded magnetic area, thus completely obliterating the magnetic code. The second reason such a system is impractical is that, even if the magnetic coded region could be maintained distinct, the system requires a mganetic reading head positioned at a wayside station suitably close to the track that the magnetic coded regions can be detected. Such a magnetic reading station would not have suitable clearance with the vehicle and would have to be positioned illegally close to the railway track to detect the magnetic coded regions on the truck of the vehicle.

It is thus an object of this invention to provide an improved system for automatically identifying moving objects.

It is another object of this invention to provide a system for automatically identifying railway vehicles passing a wayside point.

It is another object of this invention to provide a system for automatically identifying moving railway vehicles passing a wayside point which will operate reliably under the most adverse conditions.

It is yet another object of this invention to provide a system for automatically identifying moving railway vehicles passing a wayside point which will operate reliably in all weather conditions.

It is still another object of this invention to provide a system for automatically identifying moving railway vehicles passing a wayside point in which the cost of the apparatus which must be attached to each vehicle is held to a practical minimum.

It is still another object of this invention to provide a system for automatically identifying moving railway vehicles passing a wayside point in which the information identifying the vehicles can be transmitted through standard Teletype communication equipment to a central office.

Briefly stated, and in accordance with one embodiment of the present invention, a system for identifying moving railway vehicles is provided which includes a source of radiant energy positioned at a wayside point. Radiant energy from the source is directed onto moving vehicles passing the wayside point such that each vehicle is scanned by the radiant energy. Each vehicle carries an identification member which reflects the radiant energy in a predetermined code identifying the specific vehicle. Means are provided at the wayside point which receives the reflected radiant energy and which produces an electric signal corresponding to the reflected radiant energy. Storage means stores the electric signal while an identification member is being scanned and provides an output signal during the longer time interval before the identification member of the next vehicle is scanned. This output signal operates suitable means, such as a paper tape punch, which provides a compatible input signal to a standard Teletype system, which system provides information to a point of utilization identifying the vehicles passing the wayside point.

Other objects and advantages of the invention, together with an understanding of the operation thereof, may be obtained from the following description of the attached drawings, in which:

FIG. 2 is an elevational view of a railway vehicle upon which is mounted a car identification member and a scanner position at a wayside point to read the car identification member;

FIG. 3 is a top view of three railway vehicles passing a wayside scanner unit;

Figure 5A:
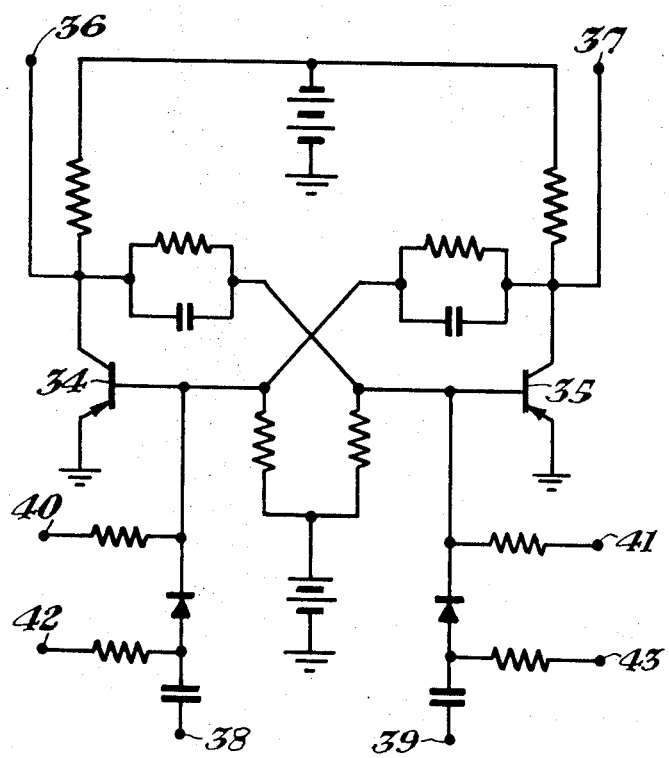
Figure 5B:
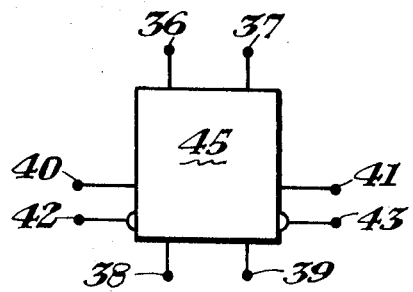
Figure 5C:
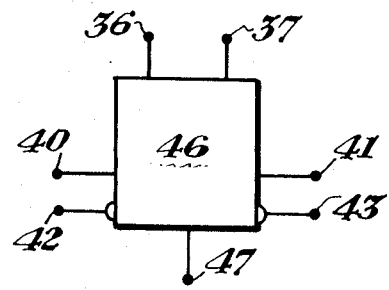

FIGS. 5a, 5b, and 5c show a circuit diagram for and symbolic representations of a bistable flip-flop circuit useful in the present invention;

FIG. 6 shows a block diagram of an automatic car identification system in accordance with the present invention;

FIG. 7 shows the relation between FIGS. 8 through 12; and

FIGS. 8 through 12 show details of the components of the block diagram of FIG. 6.

Similar reference characters refer to similar parts in each of the several views.

Figure 1:
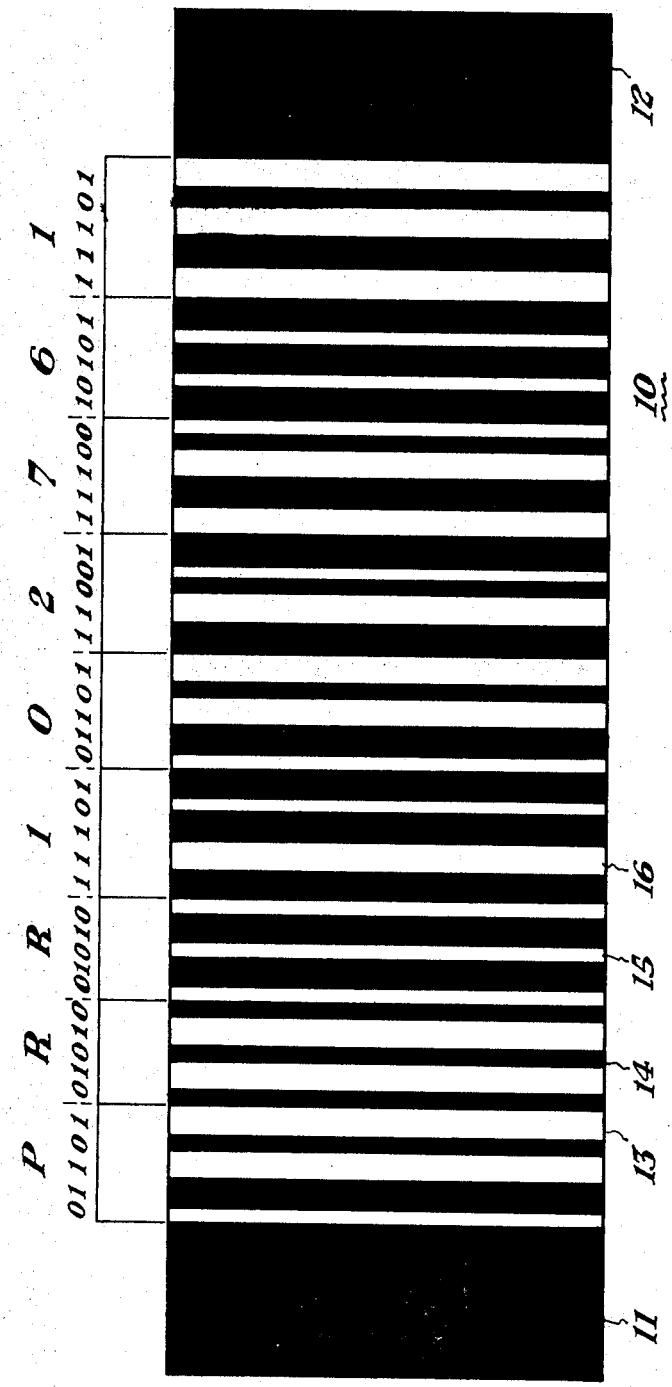
FIG. 1 shows an identification member which may be attached to a moving object to identify the object.

FIG. 1 shows a car identification member 10 which may be attached to a railway vehicle to identify the vehicle. Identification member 10 includes end regions 11 and 12 each of which are nonreflective of radiant energy. Positioned between end regions 11 and 12 are a suitable number here shown as forty-five adjacent regions which are alternately reflective, such as region 13, and nonreflective, such as region 14, of radiant energy, such as visible light or infrared radiant energy. Reflective regions such as region 13 are preferably made of lectnicular or other retroreflective material, such as the material marketed under the trade name Scotchlite by Minnesota Mining and Manufacturing Company. Each of the forty-five regions between end regions 11 and 12 represents a bit of information which is determined by the width of the region. Thus, the regions are either of a narrow width, such as region 15, or of a wide width substantially twice the width of region 15, such as region 16. The forty-five regions form a binary code in which each of the narrow regions such as region 15 represents a binary zero (0) and each of the wide regions such as region 16 represents a binary (1).

The standard Teletype code employed in this country is the Baudot code in which letters and numerals are represented by a specific predetermined combination of five marks and spaces for logical ones (1's) and logical zeros (0's). The Baudot code is as follows:

LETTERS

A—11000
B—10011
C—01110
D—10010
E—10000
F—10110
G—01011
H—00101
I—01100
J—11010
K—11110
L—01001
M—00111

N—00110
O—00011
P—01101
Q—11101
R—01010
S—10100
T—00001
U—11100
V—01111
W—11001
X—10111
Y—10101
Z—10001

FIGURES

1—11101
2—11001
3—10000
4—01010
5—00001

6—10101
7—11100
8—01100
9—00011
10—01101

COMMAND FUNCTIONS

Line Feed—01000
Letter Shift—11111
Space—00100

Carriage Return—00010
Figure Shift—11011
Blank—00000

Railway vehicles are usually identified by a combination of three letters and six numerals or figures, with the three letters representing the ownership of the vehicle and the six numerals represent the owner's number of the vehicle. Thus, each railway vehicle is identified by a unique combination of nine characters.

To represent nine characters in the Baudot code requires forty-five bits of information. The forty-five regions of identification member 10 between end portions 11 and 12 represent these forty-five bits of information, with each narrow region such as region 15 representing a space or logical zero in the Baudot code and each wide region such as region 16 representing a mark or logical one in the Baudot code. The first three sets of five adjacent regions represent letter characters and the last six sets of five adjacent regions represent figure characters. In accordance with the above given code, the particular car identification member 10 shown in FIG. 1 represents a vehicle identified as "PRR 102761," with this combination of characters indicating that the vehicle is owned by the Pennsylvania Railroad and that it bears their number "102761."

Of course, any other arbitrary code, such as, for example, a binary coded decimal scheme, could be used with the invention. However, the Baudot code is presently preferred so that the system is compatible with existing Teletype communication systems without the necessity for any code conversion equipment.

It is observed that the color or reflective property of the regions of car identification member 10 in no manner effect the significance of the region but that instead only the width of the region determines whether the region represents a logical one or a logical zero. Thus, in the adjacent "R's" the width of each of the corresponding regions is the same but the color or reflective property of the corresponding regions is opposite.

FIG. 2 shows an elevational view of a railway car 18 on a section of track 19. Mounted near one end of one side of car 18 is a car identification member 10 similar to the one shown in FIG. 1. Mounted at a wayside point is a scanner unit 20 on a pedestal 21. Scanner unit 20 directs radiant energy 22 onto the car identification member 10 as car 18 passes the wayside point and receives reflected radiant energy 23 which is reflected by the reflective portions of car identification member 10. Scanner unit 20 includes detecting means for detecting the radiant energy 23 and means for reading the car identification member 10 in response to the reflected radiant energy 23, to be described later in detail.

The radiant energy 22 from scanner unit 20 may be any form of radiant energy which may be reflected and detected, such as visible light or infrared radiant energy. In practice, it has been found that infrared radiant energy is superior to visible light for this application, since the infrared radiant energy is not adversely effected by weather conditions such as fog and snow.

FIG. 3 is a top view of a wayside point such as was shown in FIG. 2 and shows three railway vehicles passing a scanner unit 20. Each of the cars 18 has two car identification members 10 attached thereto, with the two car identification members 10 being positioned at diagonally opposite points. Thus, a car identification member 10 is carried in a proper position to be read regardless of the direction the car 18 is turned.

FIG. 3 also shows another feature of the invention in accordance with which the scanner unit 20 is positioned so that the radiant energy 22 therefrom strikes the car identification member 10 at an angle other than normal thereto. If the reflective portions of member 10 are of a lenticular or other retroreflective material such as was previously described, radiant energy 23 is still properly reflected back to scanner unit 20 to be detected. However, only retroreflective material such as is incorporated in member 10 reflects the radiant energy back to the scanner unit 20 to be detected and if the radiant energy 22 strikes a car having a shiny surface or other reflective material, the radiant energy is reflected away from scanner unit 20 and is not returned to give a false indication.

Figure 4A:
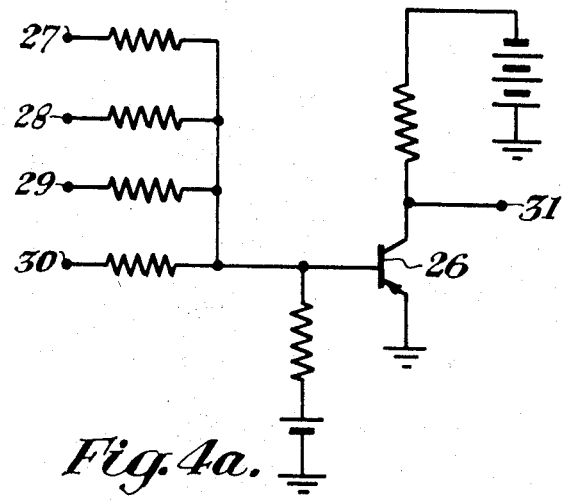
FIGS. 4a and 4b show a circuit diagram for and a symbolic representation of a NOR logic gate useful in the present invention.

FIG. 4a shows a circuit diagram of a NOR logic gate which is useful in the practice of the present invention. Detailed applications of the logic gate are later described. The circuit is well known to those skilled in the art, with a description and discussion of the circuit appearing at p. 131 of General Electric's Transistor Manual, 5th ed. In the absence of any input signal to input terminals 27, 28, 29, or 30, transistor 26 is biased to cut off and a negative voltage exists at output terminal 31. However, if a negative input signal, indicative of a logical one, is applied to any one of the input terminals 27, 28, 29, or 30, transistor 26 is rendered heavily conductive, and the output terminal 31 is then essentially at ground potential, which ground potential is indicative of a logical zero. The operation of the circuit may thus be expressed by the following equation:

$$S_{31} = \overline{S_{27} + S_{28} + S_{29} + S_{30}}$$

where S represents the signal at the corresponding terminal.

Since in the circuit of FIG. 4a, a negative voltage indicates a logical one and a zero voltage indicates a logical zero, that circuit employs a PNP transistor 26. If it is desired to use a logic system in which a positive voltage indicates a logical one and a zero voltage indicates a logical zero, it is only necessary to employ an NPN transistor instead and to reverse the polarity of the source and bias batteries shown. However, the "negative logic" system is employed throughout the remainder of the description.

Figure 4B:
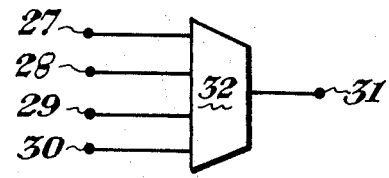

FIG. 4b shows a symbolic representation 32 of the circuit of FIG. 4a, and shows the input terminals 27, 28, 29, and 30 and the output terminal 31. This symbolic representation of the NOR logic gate is used throughout the detailed discussion of the system. Of course, if it is desired to show a NOR gate having a number of input terminals other than four as shown, the symbolic representation is used having only the desired number of input terminals. It is observed that such a NOR gate having a signal input terminal functions as an inverter.

FIG. 5a shows a circuit diagram of a bistable flip-flop circuit useful in the practice of the present invention. Applications of this circuit are described in the detailed description of FIGS. 8 through 12. The flip-flop circuit itself is well known to those skilled in the art, with similar flip-flop circuits being described and discussed on pp. 109 and 110 of General Electric's Transistor Manual, 5th ed., so the description of the operation of the circuit is brief.

The circuit is capable of assuming either of two stable operating conditions, in each of which one but not the other of transistors 34 and 35 is conductive. The two states of conduction are arbitrarily designated as the "set" and "reset" states of teh flip-flop. When the circuit is in its set condition, transistor 34 is conducting and the transistor 35 is nonconducting. At this time, zero volts exist at output terminal 36 and a negative voltage exists at output terminal 37. When the circuit is in its reset condition, transistor 34 is nonconducting and transistor 35 is conducting, with a negative voltage existing at output terminal 36 and zero volts existing at output terminal 37.

In the absence of any inhibiting voltage, to be described later, the flip-flop is set by the application of either a positive pulse to terminal 39 or a negative voltage to terminal 40 and is reset by the application of either a positive pulse to terminal 38 or a negative voltage to terminal 41. If a negative voltage, which may be termed an inhibit voltage, is applied to terminal 42, the application of a positive pulse to terminal 38 does not reset the flip-flop circuit, since the associated diode is back biased and rendered nonconductive by the inhibit voltage. In a similar manner, the application of a negative inhibit voltage to terminal 43 back biases the associated diode and the application of a positive pulse to terminal 39 does not set the flip-flop circuit. It is observed that the inhibit voltages themselves do not change the state of he flip-flop. They merely inhibit pulses applied to terminals 38 and 39, thus preventing any change of state of the flip-flop if these positive pulses should be applied.

In a slight modification of the circuit also well known to those skilled in the art, input terminals 38 and 39 are connected together. In such a circuit, the application of a positive pulse to the common input terminal results in a reversal of the state of the flip-flop regardless of the state of flip-flop, assuming no inhibit voltages are applied to terminal 42 or 43. If an inhibit voltage is applied to terminal 42 or 43, the flip-flop assumes the state commanded by the inhibit voltage upon the application of a positive pulse to the common input terminal.

FIG. 5b shows a symbolic representation 45 of the circuit of FIG. 5a which is used in the remainder of this discussion. The corresponding terminals have like numbers.

FIG. 5c shows a symbolic representation 46 of the previously described modification of the circuit of FIG. 5a in which the terminals 38 and 39 are connected to a common input terminal 47.

In some applications of the flip-flop circuit, not all terminal connections are used. In those applications in which only a portion of the terminals are utilized, only those utilized terminals are shown.

FIG. 6 shows a block diagram of a system for automatically identifying moving railway vehicles in accordance with the present invention.

In the preferred embodiment of the present invention, infrared radiant energy is focused onto the previously described car identification members 10 which are attached to railway vehicles traveling past a wayside point. A portion of this infrared radiant energy is reflected by the members 10 and is returned to the source of radiant energy and detected so as to read the car identification member 10 and to identify the vehicle carrying the member. The resultant signal from the detection equipment directly represents the identification of the vehicle and could be transmitted directly to a central office for suitable processing if the necessary communication equipment were provided. However, when a train passes a wayside point at relatively high speed, the information obtained by the system is of a much higher speed than can be transmitted over conventional Teletype systems. As was previously observed, it is more economical, and thus desirable, to provide a system which is compatible with existing Teletype equipment. Thus, in accordance with one of the features of the present invention, the information obtained as the car is passing a wayside point is temporarily electrically stored in equipment at the wayside point as the identification member is read, is transferred to punched paper tape or other such form suitable for use as an input to a Teletype transmitter during the interval between cars of the train, and is then fed into a Teletype transmitter at whatever rate the Teletype transmitter can receive the punched tape, with the Teletype transmitter then transmitting standard Teletype signals to a Teletypewriter located in a central office or other point of utilization of the information.

The system may be said to operate in two modes, with the system operating in a scan mode during the time a car identification member 10 is actually being read, at which time the information so being read is temporarily electrically stored in the system, and in a punch mode during the interval of time between reading of car identification members. During the punch mode, the information temporarily electrically stored is transferred to a punched paper tape or other storage media which is suitable for use as an input source for a Teletype transmitter.

Since the temporary electrical storage occurs essentially instantaneously as the car identification member 10 is being scanned, the primary limiting factor on the speed of the system is the paper tape punch, since the punched tape output of the punch can be temporarily stored so as to be fed into the Teletype transmitter at a rate receivable by the transmitter. Using standard commercially available paper tape punches, the system can punch out the previously described nine characters during the time interval required for a standard length freight car to pass a wayside point while traveling at about 180 miles per hour. Thus, the present system provides a wide operating range with respect to the velocity of a train passing a wayside point and can easily identify all properly equipped cars on any train passing at any practical speed.

Turning now to a detailed description of the block diagram of FIG. 6, radiant energy 22 is focused on a car identification member 10. As the car carrying member 10 moves past the wayside point, radiant energy is reflected and the reflection 23 therefrom is detected and converted into electrical signals by Scanner and Amplifier 50, which provides electrical signals of a uniform strength to Scanner Logic 51. The Scanner Logic 51 decodes the received signals into logical ones and zeros corresponding to the car identification member 10 being read and also determines the direction in which the car is moving. Mode Box 52, which is in the scan mode at the beginning of the scan operation, turns on Scan Gate 53, which receives a pulse from Scanner Logic 51 as each bit of information is decoded by the logic. Scanner Logic 51 also provides a signal to a forty-five bit Shift Register 54, which signal indicates whether the present bit being read is a logical one or a logical zero. Scan Gate 53 synchronously applies shift pulses received from Scanner Logic 51 to Shift Register 54 as the binary information from Scanner Logic 51 is fed into Shift Register 54, and thus the forty-five bits of information are shifted into Shift Register 54.

Scan Gate 53 also applies the shift pulses to Error Check 55, which checks to see that exactly forty-five bits of information are received and provides an error signal (in a manner to be later described) if more or less than forty-five bits are received.

After the car identification member 10 has been completely read, Scanner Logic 51 provides a signal to the Mode Box 52 so indicating, and Mode Box 51 shifts the mode of operation of the system into the punch mode. At this time Mode Box 52 provides an inhibit signal to Scanner Logic 51 so as to inhibit further reading operation and also provides a signal to Punch Gate 56 to enable this gate.

When a train passes the wayside point in one direction, a car identification member 10 attached to the cars is read in a first sequence and when the train passes in the opposite direction, the car identification member 10 is read in the opposite sequence. Thus, the information stored in Shift Register 54 is stored in a first sequence for cars moving in one direction, which may be arbitrarily designated the East direction, and in a second sequence for cars moving in the other direction, which may be arbitrarily designated the West direction. It is therefore necessary to remove the information from Shift Register 54 in a first manner for cars moving in the East direction and in a second manner for cars moving in the West direction.

For one direction of car travel, the first five bits of information in Shift Register 54 represent the first letter of the car identification and in the opposite direction of travel, the last five bits of information in Shift Register 54 represent this first letter. Thus, the information is removed five bits at a time from one end of Shift Register 54 for one direction of car travel and from the other end of Shift Register 54 for the other direction of car travel. The end from which the information is removed is determined by Code Reverse 61, which receives a signal from Scanner Logic 51 indicative of the direction of travel of the car.

Shift Control 58 also receives this signal indicative of the direction of travel of the car. In response to this received signal, Shift Control 58 allows either five pulses from Oscillator 57 to pass through Punch Gate 56 and be applied as shift pulses to Shift Register 54 or forty pulses to pass from Oscillator 57 through Punch Gate 56 and to be applied as shift pulses to Shift Register 54. The output of the final bit of information in Shift Register 54 is connected to the input of the first bit of information in Shift Register 54; thus, to shift the register forty pulses forward is the equivalent of shifting the register five pulses backward and Shift Register 54 is in effect a reversible shift register which is either advanced or reversed five shifts at a time by shift pulses from Oscillator 57 passing through Punch Gate 56 under the control of Shift Control 58.

The binary output signals of Shift Register 54 pass through Code Reverse 61 and are applied to Tape Punch 62, which was previously enabled by Mode Box 52 as the system went into the punch mode. Tape Punch 52 punches the information received from Shift Register 54 into a paper tape 63 or other suitable form of storage media which may serve as an input to a Teletype transmitter. The punched paper tape 63 is stored in a Tape Storage bin 64 until the Teletype Transmitter 65 can convert the punched tape into Teletype electrical signals, which are transmitted over a line to an office or other point of utilization, at which point a Teletypewriter types the information identifying the vehicles passing the wayside point.

Tape Punch 62 provides a pulse to Character Counter 66 and Shift Control 58 as each character is punched into the paper tape 63. The pulse applied to Shift Control 58 resets the control so as to permit Shift Register 54 to be shifted to obtain a signal indicative of the next character to be punched.

Character Counter 66 counts the characters being punched by Tape Punch 62 and instructs Print Program 67, which inserts the necessary command signals into Tape Punch 62. For example, in the code previously described, it is desired to print three letters followed by six figures. Thus, Print Program 67 instructs Tape Punch 62 to punch "Space" after the third letter and to punch the instruction "Figure Shift" after "Space." Print Program 67 allows the six figures to be punched into paper tape 63 during the counts six through eleven of Character Counter 66. At the count of twelve, Print Program 67 inserts a command "Letter Shift," at the count of thirteen, Print Program 67 inserts a command "Carriage Return" and at the count of fourteen, Print Program 67 inserts a command "Line Feed." These commands control the operation of the Teletypewriter at the central office.

At the count of fifteen, Character Counter 66 operates a Reset mechanism 68, which resets Character Counter 66 and shifts Mode Box 52 back into the scan mode, at which time the system is ready to scan the car identification member 10 on the next car of the train.

In the event that exactly forty-five bits of information are not received from the car identification member 10, the previously mentioned Error Check 55 provides a signal to Print Program 67, which gives an indication to Tape Punch 62 that a correct code was not received. For example, Print Program 67 may instruct Tape Punch 62 to insert some character, such as the letter "X," in the space which normally appears between the three letters and the six figures of the car identification. Thus, an operator at the central office reading the output of the tele-Typewriter receives an indication that a correct code was not received for the particular car.

FIG. 7 shows the relation of FIGS. 8 through 12, which figures show details of the components of the block diagram of FIG. 6.

FIG. 8 shows details of Scanner and Amplifier 50 and Scanner Logic 51. Scanner and Amplifier 50 comprises five detectors and three amplifiers. The detectors may be any form of device sensitive to impinging radiant energy of the frequency used in the system, such as infrared radiant energy. Of the five detectors, whose relative positions are shown, detectors A and B perform the actual reading operation of a car identification member 10 upon a car passing the scanner unit. The three detectors C1, C2 and C3, whose function is later described, have their outputs electrically connected and applied to a common amplifier 70. The output signal from detector A is applied to amplifier 71 and the output signal from detector B is applied to amplifier 72. The amplifiers 70, 71 and 72 each provides an output signal of a first predetermined magnitude whenever an associated detector receives a reflected radiant energy signal and of a second predetermined magnitude when the associated detector receives no such reflected signal.

As a train passes the scanner unit, radiant energy reflected from a car identification member 10 successively impinges upon the five detectors, this scanning action being caused by the relative motion of the car identification member 10 and the scanning unit. In the shown embodiment, for an eastbound train radiant energy reflected from the identification members impinges upon detector A prior to impinging upon detector B and for a westbound train, radiant energy reflected from an identification member impinges upon detector B prior to impinging upon detector A. In the embodiment to be described in detail, the detector upon which radiant energy first impinges may be termed the controlling detector; thus, for an eastbound train detector A is the controlling detector and for a westbound train detector B is the controlling detector.

The relative position of detectors A and B is such that, in conjunction with a suitable lens system (not shown) detectors A and B are focused upon the car identification member 10 at points spaced approximately 1½ times the width of a narrow region indicative of a binary zero on car identification member 10. In a manner to be described in detail later, the outputs of detectors A and B are sampled each time the controlling detector changes its condition, that is, each time the controlling detector transfers from either the condition of receiving reflected radiant energy to the condition of not receiving reflected radiant energy or transfers from the condition of not receiving reflected radiant energy to the condition of receiving reflected radiant energy. If the controlling detector has just finished scanning a narrow region indicative of a binary zero at the time of this transition, each of the detectors A and B is in the same condition, either both receiving reflected radiant energy or both not receiving reflected radiant energy, since the two detectors are focused on points straddling the narrow region indicative of the binary zero and are thus each focused on points having similar reflective properties. This coincidence of condition of the two detectors is thus indicative that a binary zero was just read from a car identification member 10. However, if the two detectors are in opposite conditions at the time of this transition, a binary one was just read from car identification member 10, since the controlling detector is now focused on the next region and the other detector, being focused 1½ units behind the controlling detector, is still focused in the wide region indicative of a binary one. Thus, this difference of condition of the two detectors at the time of a transmission of the controlling detector indicates that a binary one has just been read from a car identification member 10.

In an alternative embodiment (not shown) the detector upon which the reflected radiant energy last impinges upon may be the controlling detector. Again, the outputs of the detectors are sampled each time the condition of the controlling detector changes. However, it is seen that in this embodiment a coincidence of the detectors indicates that a logical one is being received while a difference in condition indicates that a logical zero is being received.

Since, as was previously described, the system utilizes a negative logic system, amplifier 70 provides a negative voltage signal C to Scanner Logic 51 whenever any one of the detectors C1, C2 or C3 is receiving reflected radiant energy. In a similar manner, amplifier 71 provides a negative voltage signal A to Scanner Logic 51 whenever detector A is receiving reflected radiant energy and amplifier 72 provides a negative voltage signal B to Scanner Logic 51 whenever detector B is receiving reflected radiant energy. The output signals of amplifiers 71 and 72 are also applied to NOR gates 73 and 74, respectively, which gates invert the output signal of the amplifiers and provide the output signals $\bar{A}$ and $\bar{B}$, respectively, the presence of either of which indicates that the associated detector is not receiving reflected radiant energy.

The signals A and $\bar{B}$ are applied to NOR gate 77 and the signals $\bar{A}$ and B are applied to NOR gate 78. NOR gates 77 and 78 also receive a gating signal which allows these gates to sample the outputs of detectors A and B at the time the controlling detector changes from one condition to another. The source of this gating signal is later described.

If at the time the gating signal is applied to gates 77 and 78 both detectors A and B are in the same condition, thus indicating that a binary zero was just read, then either the negative voltage signal A is applied to gate 77 and the negative voltage signal B applied to gate 78 or the negative voltage signal $\bar{A}$ is applied to gate 78 and the negative voltage signal $\bar{B}$ is applied to gate 77. In either event, both gates are receiving a negative input signal and thus each gate has a zero voltage output signal. These two zero voltage signals are applied to NOR gate 79 which gate also receives an inhibit signal from Mode Box 52 over conductor 123 in a manner to be described later and the output signal of NOR gate 80, the function of which is later described. Assuming that no inhibit signal is received from Mode Box 52, which would be the case when the system is operating in the scan mode, and assuming that NOR gate 80 has a zero voltage output signal, then the presence of the two zero voltage signals from gates 77 and 78 causes a negative voltage output signal to occur from gate 79. This output signal is applied to NOR gate 81 and to conductor 82. Gate 81 also receives the inhibit signal from Mode Box 52 and again assuming that no inhibit signal is present, gate 81 inverts the output signal from gate 79 and provides a zero voltage output signal on conductor 83. Thus, the occurrence of a negative voltage output signal on conductor 82 and a zero voltage output signal on conductor 83 indicates that a binary zero has just been read by the system.

If at the time the gating signal is applied to gates 77 and 78 the detectors A and B are in different conditions, thus indicating that a binary one has just been read, then either the signals A and $\bar{B}$ are both negative voltages or the signals $\bar{A}$ and B are both negative voltages and in either event two negative signals are applied to one of the gates 77 and 78 and two zero voltage signals are applied to the other of the gates 77 and 78. At this time the gate having the two zero voltage input signals provides a negative voltage output signal which is applied to gate 79, thus causing gate 79 to have a zero voltage output signal, with this zero voltage output signal being applied to gate 81 and conductor 82. Gate 81 inverts the zero voltage signal and provides a negative voltage output signal on conductor 83. Thus, the presence of a zero voltage output signal on conductor 82 and a negative voltage output signal on conductor 83 indicates that a binary one has just been read by the system.

The output signals on conductors 82 and 83 which indicates whether a binary one or binary zero has just been read by the system are applied to Shift Register 54 of FIG. 9 in a manner to be later described.

The signals A, B, and C are each applied to a NOR gate 84. If all of the detectors are receiving no reflected radiant energy, then each of the input signals to gate 84 is zero volts and gate 84 provides a negative voltage output signal on conductor 85. This condition exists only during the time that no car identification member 10 is being scanned and the occurrence of the negative signal on conductor 85 indicates to Mode Box 52 of FIG. 10 that the scanning operation has been completed. The operation of this portion of the system is later described. The output signal of gate 84 is also applied to NOR gate 86, whose output is applied to one of the inputs of NOR gate 87, whose output is applied to one of the inputs of gate 86. Gate 87 also receives the signals A and B through suitable delay means, such as inductors 88 and 89, respectively. The operation of this portion of the system is as follows: During the period that the system is in the scan mode of operation but before a car identification member 10 is actually being scanned by the unit, each of the signals A, B, and C is zero volts and gate 84 thus provides a negative voltage output signal on conductor 85, which signal is applied to gate 86. Gate 86 thus has a zero voltage output signal, which zero voltage signal is applied to one of the inputs of gate 87. The other inputs of gate 87 are also zero volts, and thus gate 87 has a negative voltage output signal, which is applied to the other input of gate 86. When a car identification member 10 first begins to be scanned by the unit, first detector C1 and then detector A receives radiant energy if the car being scanned is traveling in an eastern direction or first detector C3 and then detector B receives radiant energy if the car is traveling in a western direction. In either event, gate 84 now receives a negative voltage input signal and thus provides a zero voltage output signal on conductor 85, which provides a zero voltage input signal to one of the inputs of gate 86. After the delay period caused by either inductor 88 or inductor 89, a negative voltage input signal is also applied to gate 87, which provides a zero voltage output signal from this gate. This zero voltage output signal is applied to the other input of gate 86, whereby gate 86 thus has two zero voltage input signals and provides a negative voltage output signal, which signal is applied to the input of gate 87 and through delaying inductor 90 to NOR gates 91 and 92.

The negative voltage signal applied to the input of gate 87 by gate 86 assures that gate 87 maintains a zero voltage output signal during the remainder of the scan operation regardless of the condition of detectors A and B, which provide the other inputs to this gate.

Gates 91 and 92 have as their other inputs the signal $\bar{A}$ and $\bar{B}$, respectively, and the inhibit signal from Mode Box 52. During the interval of time when the system is in the scan mode and before a car identification member 10 is being scanned, gates 91 and 92 receive zero voltage input signals from gate 86 and no inhibit signal from Mode Box 52. The gates also receive the negative voltage signals $\bar{A}$ and $\bar{B}$ and thus the output of each of gates 91 and 92 is zero volts. However, when a car identification member 10 is first being scanned and during the delay period caused by inductors 88 or 89 and 90, one or the other of gates 91 and 92 receives all zero voltage input signals, depending upon the direction of travel of the car being scanned, and thus provides a negative voltage output signal during this delay period. For example, if the car being scanned in traveling in the East direction, the signal $\bar{A}$ becomes zero volts and gate 91 provides a negative voltage output signal during the delay interval caused by the inductors. Conversely, if the car being scanned is traveling in the West direction, the signal $\bar{B}$ becomes zero volts and gate 92 provides a negative voltage output signal during the delay interval caused by the inductors.

Assuming the car being scanned is traveling in the East direction, the negative voltage output signal of gate 91 is applied to NOR gate 95, thereby causing a zero voltage output signal from this gate. This zero voltage output signal is applied to one of the inputs of NOR gate 96, the other input of which is receiving a zero voltage output signal from gate 92. This causes a negative voltage output signal from gate 96, which is applied to the other input of gate 95 to assure that the output of gate 95 remains zero volts during the remainder of the scanning operation.

The zero voltage output of gate 95 and the negative voltage output of gate 96 are also applied to conductors 97 and 98, respectively, with a negative voltage signal on conductor 98 indicating that the car being scanned is traveling in the East direction.

Assuming now that the car being scanned is traveling in the West direction instead, the signal $\bar{B}$ becomes zero volts and gate 92 receives three zero voltage input signals during the delay interval caused by the inductors. This causes a negative voltage output signal from gate 92, which is applied to the other input of gate 96, thereby causing a zero voltage output signal from this gate. This zero voltage signal is applied to the other input terminal of gate 95, thereby causing a negative voltage output signal from this gate. This results in a negative voltage signal on conductor 97 and a zero voltage signal on conductor 98, with this condition indicating that the car being scanned is traveling in the West direction.

The output signals of gates 95 and 96 are also applied to input terminals of NOR gates 99 and 100, respectively. The other input signals of gates 99 and 100 are the signals $\bar{A}$ and $\bar{B}$, respectively. The output signals of gates 99 and 100 are applied to NOR gate 101, with the output signals of each of the gates 99, 100 and 101 being applied to a differentiating network 102, an output of which is applied to a conventional one-shot or monostable multivibrator 103.

The operation of this portion of the system is a follows: When an eastbound train is being scanned, a negative input signal is provided to gate 100 by gate 96, thereby providing a continuous zero voltage output signal from gate 100. At this time gate 99 receives a zero voltage input signal from gate 95 and the output signal of gate 99 is dependent upon the nature of the other input to the gate, which is the signal $\bar{A}$. As was previously observed, for an eastbound train detector A is the controlling detector, and it is desired to provide a gating pulse to gates 77 and 78 to sample the outputs of detectors A and B whenever controlling detector A changes its condition. Whenever the condition of controlling detector A changes from the state of receiving reflected radiant energy to the state of not receiving reflected radiant energy, the signal $\bar{A}$ changes from zero volts to a negative voltage, resulting in a change of the output signal of gate 99 from a negative voltage to a zero voltage. This changing voltage is applied to the differentiating network 102 and results in a positive going voltage pulse being applied to one-shot multivibrator 103. Whenever the condition of controlling detector A changes from the state of not receiving reflected radiant energy to the state of receiving reflected radiant energy, the output signal of gate 99 changes from zero volts to a negative voltage and thus the output signal of gate 101 changes from a negative voltage to zero volts, with this last mentioned change of voltage being applied to differentiating network 102 and also causing a positive going voltage pulse to be applied to one-shot multivibrator 103.

When a westbound train is being scanned by this system, a negative voltage signal is always applied to one of the input terminals of gate 99 by gate 95 and a zero voltage signal is applied to one of the input terminals of gate 100 by gate 96. The output signal of gate 100 is thus dependent upon the input signal to its other input terminal, which is the signal B̄. At this time detector B is the controlling detector and in a similar manner the output signal of gate 100 is differentiated by differentiating network 102 to provide a positive going voltage pulse to the input of one-shot multivibrator 103 whenever the condition of detector B changes from the state of receiving reflected radiant energy to the state of not receiving radiant energy and the output signal of gate 101 is differentiated by differentiating network 102 to provide a positive going voltage pulse to the input of one-shot multivibrator 103 whenever the condition of controlling detector B changes from the state of not receiving reflected radiant energy to the state of receiving reflected radiant energy. Thus, a positive going voltage pulse is provided to the input of one-shot multivibrator 103 whenever the condition of the controlling detector changes, regardless of which detector is the controlling detector and regardless of which direction the change occurs.

One-shot multivibrator 103 normally has a zero voltage output but when triggered by a positive going input signal has a negative voltage output signal for a predetermined interval of time thereafter. The output signal of one-shot multivibrator 103 is applied to a conductor 106, which applies the pulse to scan gate 53 in a manner to be later described. This portion of the output signal of one-shot multivibrator 103 provides the synchronous trigger pulse of Shift Register 54' in a manner to be later described. The output signal of one-shot multivibrator 103 is also applied to one of the input terminals of the previously described NOR gate 80 and the sole input terminal of NOR gate 107, which inverts the signal and applies it to input terminals of gates 77 and 78, thereby applying zero volts to the input terminals of these gates only at the time it is desired to sample the outputs of detectors A and B. At all other times, the output of gate 107 is a negative voltage which, when applied to input terminals of gates 77 and 78 causes each of these gates to have a zero voltage output signal.

At all times except when the multivibrator 103 is fired the zero voltage output of the multivibrator is applied to one of the input terminals of gate 80. This gate serves to insure that the output signals of gates 79 and 81, which indicate whether a binary one or binary zero was just read, remains constant until the next gating pulse is applied to gates 77 and 78 by gate 107. The operation of gate 80 is as follows: During the time that the one-shot multivibrator 103 is not triggered the input signals to gate 80 are the zero voltage output of multivibrator 103 and the output signal of gate 79. If the output signal of gate 79 is zero volts, indicating that a binary one has just been read, the output signal of gate 80 is a negative voltage which, when applied to one of the input terminals of gate 79 assures that the output of gate 79 remains at zero volts. However, if the output signal of gate 79 is a negative voltage, indicating that a binary zero has just been read, the output signal of gate 80 becomes zero volts which, when applied to the other input terminal of gate 79 causes all four inputs to this gate to be zero volts, thereby assuring that the output voltage of gate 79 is a negative voltage. Since the output voltage of gate 81, which is the signal applied to conductor 83, is merely the inverse of the output signal of gate 79, gate 80 thus assures that the signals applied over conductors 82 and 83 to Shift Register 54 remain constant until the next bit of information is scanned from the car identification member 10.

FIG. 9 shows details of Shift Register 54 and Code Reverse 61 of FIG. 6.

Signals from Scanner Logic 51 indicating whether a binary one or a binary zero has just been read by the scanner unit are applied through conductors 82 and 83 to NOR gates 110 and 111, respectively. These gates also receive as input signals the output signals of NOR gates 112 and 113, respectively. As will be described later in detail, gates 112 and 113 receive a negative voltage signal on conductor 114 from Mode Box 52 whenever the system is operating in the scan mode and a zero voltage signal on conductor 114 from Mode Box 52 whenever the system is operating in the punch mode. Thus, the output signals of gates 112 and 113 are zero volts whenever the system is operating in the scan mode and the output signals of gates 110 and 111 are dependent only upon the input signals on conductors 82 and 83.

The output signals of gates 110 and 111 are applied to Shift Register 54, which is a forty-five stage shift register each stage of which is a flip-flop circuit such as was described in FIG. 5c previously. Such shift registers are well known to those skilled in the art, with a similar connection being shown at p. 110 of General Electric's Transistor Manual, 5th ed., so the operation of the shift register is not discussed here. It is observed that only the first six and last six stages of Shift Register 54 are shown herein, it being understood that the remaining intermediate thirty-three stages are similarly connected flip-flop circuits.

Figure 10:
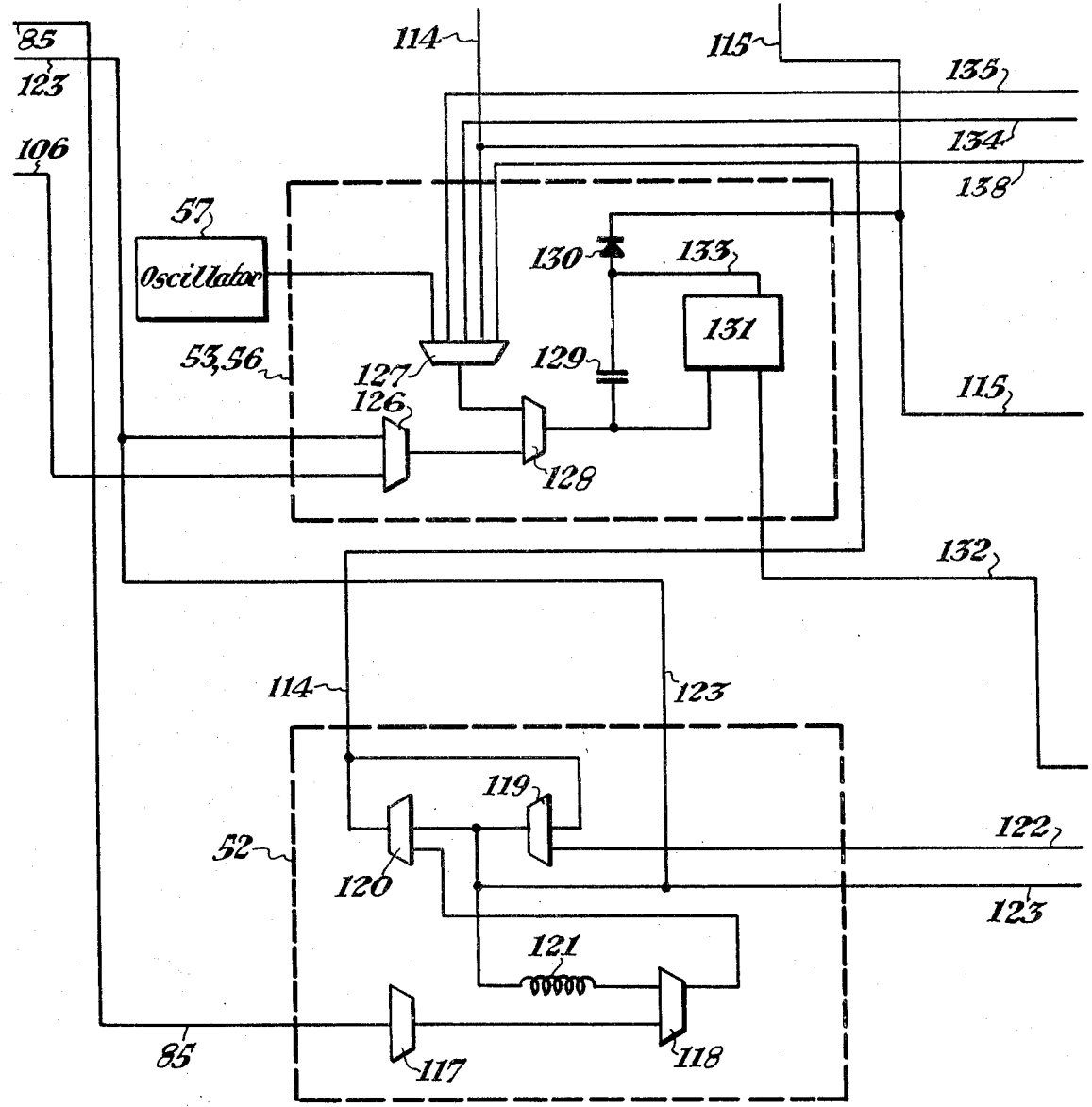

Synchronous trigger pulses are provided to Shift Register 54 over conductor 115 from Scan Gate 53 and Punch Gate 56 of FIG. 10 in a manner to be later described. As each signal is received on conductors 82 and 83 and applied to the first stage of Shift Register 54 through gates 110 and 111, a synchronous trigger pulse is delivered to Shift Register 54 over conductor 115 and thus the forty-five bits of information being carried by a car identification member 10 being scanned are successively shifted into Shift Register 54.

When the forty-five bits of information have been shifted into Shift Register 54, the scanning operation is complete and the system is now ready to punch the contents of Shift Register 54 into a paper tape during the interval of time before the next car identification member 10 is to be scanned.

When the system has completed the scanning of a car identification member, each of the five detectors is in the state of not receiving reflected radiant energy and thus the signals A, B, and C are each a zero voltage. The application of these three signals to gate 84 of FIG. 8 results in a negative output voltage from the gate which is applied through conductor 85 to Mode Box 52 of FIG. 10. The application of this negative voltage to Mode Box 52 indicates that the scanning operation is complete for the particular vehicle and commands Mode Box 52 to change the system into the punch mode so that the information stored in Shift Register 54 indicative of the identification of the vehicle may be punched out into paper tape for later teletype transmission to a central office.

Mode Box 52 comprises the NOR gates 117, 118, 119 and 120 and inductor 121 or other suitable delay device connected as shown. The operation of Mode Box 52 is as follows: The input to gate 119 on conductor 122 is normally a zero voltage except when a negative voltage reset pulse is received to change the operation of the system from the punch mode into the scan mode. This portion of the operation of the system is described in detail later. While the system is scanning a car identification member 10, a zero voltage signal is applied to gate 117 through conductor 85, resulting in a negative voltage output signal of gate 117, which is applied to one of the inputs of gate 118. This results in a zero voltage output signal of gate 118, which is applied to one of the input terminals of gate 120. The other input terminal of gate 120 is connected to receive the output signal of gate 119, which also has a zero voltage output signal during the scan operation. This results in a negative voltage output signal of gate 120 on conductor 114, which voltage is returned to the other input of gate 119 to maintain the output of gate 119 at a zero voltage. The output signal of gate 119 is also applied to the other input terminal of gate 118 through the delaying inductor 121. Thus, when the system is operating in the scan mode, a negative voltage exists on conductor 114, which is applied to the input terminals of gates 112 and 113 of FIG. 9, as was previously described, and a zero voltage exists on conductor 123, with this voltage being the previously described inhibit voltage of Scanner Logic 51 of FIG. 8.

When the scanning operation is completed and a negative voltage is applied to conductor 85, gate 117 supplies a zero voltage to one of the input terminals of gate 118, resulting in two zero voltage inputs to this gate and a negative voltage output, which is applied to one of the terminals of gate 120. Gate 120 now has a zero voltage output which is applied to the other input terminal of gate 119, resulting in two zero voltage inputs to this gate. Gate 119 now has a negative voltage output which is applied to the other input terminal of gate 120, assuring that this gate continues to have a zero voltage output during the punch operation, and which is also applied through delaying inductor 121 to the other input terminal of gate 118. After the delay interval caused by inductor 121, the negative voltage is applied to 118 and results in a zero voltage output of this gate which is applied to one of the input terminals of gate 120. Mode Box 52 is now in a stable condition in which a negative voltage exists on conductor 123 and a zero voltage exists on conductor 114, with these voltages being supplied to the other components of the system to maintain the system in the punch operation.

Mode Box 52 maintains this stable state until a negative pulse is supplied on conductor 122 to reset the system. Such a negative voltage results in a zero voltage output signal of gate 119 which, together with the other zero voltage input signal to gate 120, results in a negative voltage output signal from gate 120. This negative voltage is again applied to the other input terminal of gate 119 to maintain Mode Box 52 in this stable condition until the next negative signal is received on conductor 85. Thus, Mode Box 52 maintains the system in one of two stable conditions depending upon which of conductors 85 or 122 last received a negative voltage signal.

The operations of Scan Gate 53 and Punch Gate 56 are next described. These gates share several components so that they are both shown within the confines of a single dotted line. These gates comprise NOR gates 126, 127 and 128 and a trigger pulse gate consisting of a capacitor 129, a diode 130 and a flip-flop 131.

As was previously described, one-shot multivibrator 103 of FIG. 8 supplies synchronous trigger pulses to conductor 106 as each binary number is read from a car identification member 10. These synchronous trigger pulses are applied to one of the input terminals of gate 126 (FIG. 10) the other input terminal of which is connected to conductor 123. As was previously described, conductor 123 has a zero voltage thereupon when the system is in the scan mode. Thus, gate 126 provides an inverted output pulse for each input pulse to the gate on conductor 106, which inverted output pulse is applied to one of the input terminals of gate 128. The other input to gate 128 is the output of gate 127, which is a zero voltage during the scan mode, since one of the inputs to this gate is the negative voltage on conductor 114. Gate 128 thus reinverts the synchronous trigger signals and applies them to conductor 115 through capacitor 129 and diode 130.

At this point, it is observed that the previously described Scan Logic 51 actually "reads" forty-six bits of information from a car identification member 10, since the controlling detector makes forty-six transitions in scanning the forty-five bit car identification member. In each case Scanner Logic 51 supplies a superfluous signal indicating that a binary one has been read prior to the reading of the actual first bit of information from the car identification member 10. The disposition of this superfluous signal is as follows: Flip-flop 131 is set by the application of a positive pulse on conductor 132 at the time the system is changed from the punch mode of operation to the scan mode of operation. The source of this positive going voltage is later described in detail. Flip-flop 131 thus has a negative voltage output signal occurring on conductor 133 which is applied to the anode of diode 130 to back bias diode 130 so as to prevent trigger pulses from passing therethrough. However, the first synchronous trigger pulse output from gate 128 resets flip-flop 131, resulting in a zero voltage output signal occurring on conductor 133. Diode 130 is then properly biased to pass synchronous trigger pulses and the next forty-five synchronous trigger pulses are so passed to conductor 115 over which, as was previously described, the synchronous trigger pulses are applied to Shift Register 54 to shift the information being read into the successive stages of the shift register.

As was previously described, when the scanning operation is completed and the system is changed into the punch mode, a negative voltage appears on conductor 123 and a zero voltage appears on conductor 114, with these voltages being applied to one of the input terminals of gates 126 and 127, respectively. This causes a zero voltage output signal from gate 126 and enables gate 127 to pass the output pulses of Oscillator 57 to gate 128 and the trigger gate consisting of capacitor 129, diode 130 and flip-flop 131, assuming that gate 127 also receives other suitable input signals.

Figure 11:
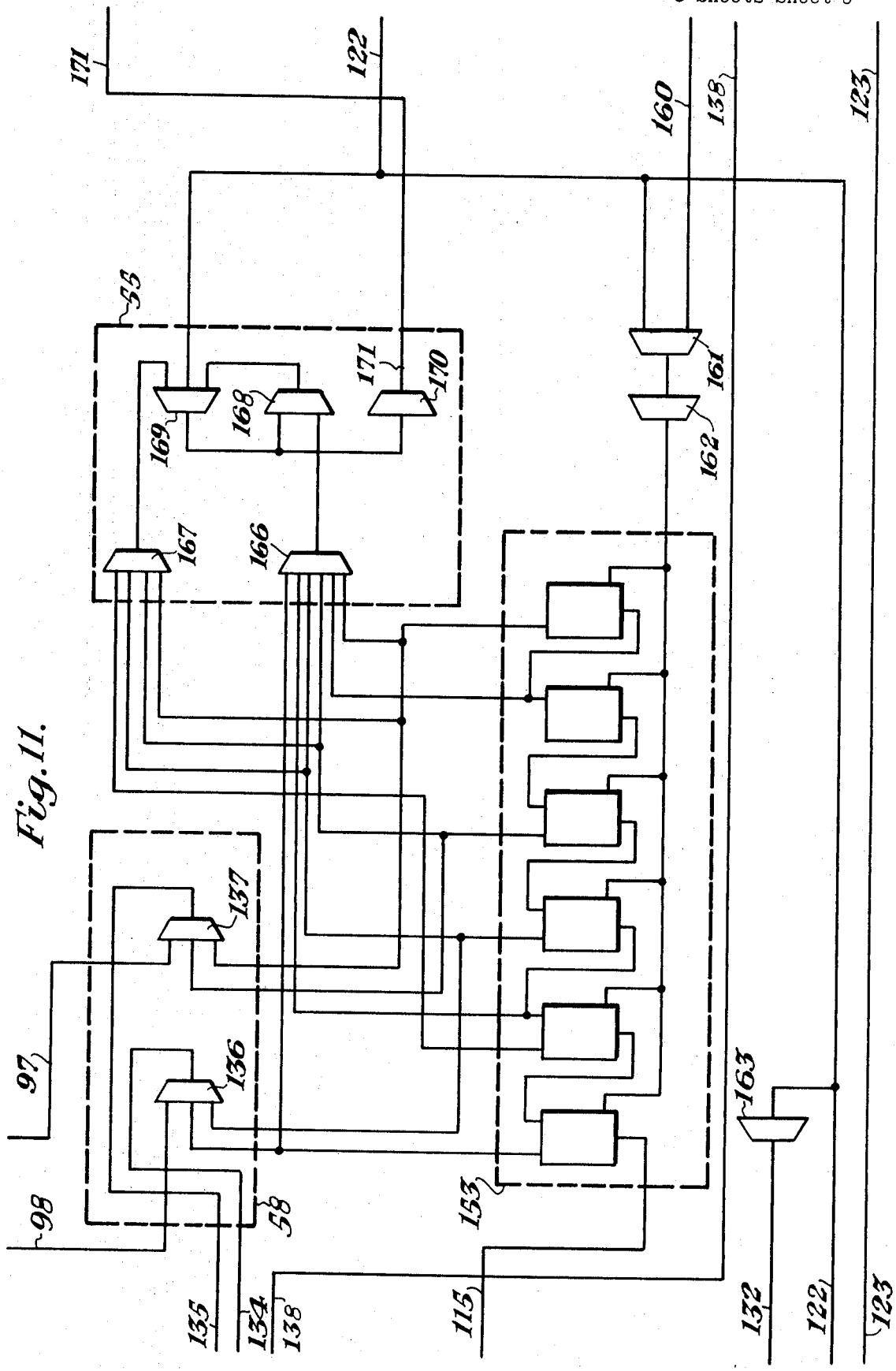

Gate 127 receives as its other input signals the output signals from Shift Control 58 of FIG. 11 through conductors 134 and 135. Shift Control 58 comprises NOR gates 136 and 137, the output signals of which are applied to the input of gate 127 through the conductors 134 and 135, respectively. The function of these gates is to control the number of pulses from Oscillator 57 which are passed through Pulse Gate 56 to Shift Register 54.

As was previously described, for one direction of car travel, information from a car identification member 10 is read by the system in a first sequence and for the other direction of car travel information from a car identification member 10 is read in the opposite sequence. Thus, it is necessary to remove the information from Shift Register 54 from one end thereof for one direction of car travel and from the opposite end thereof for the other direction of car travel. As was also previously described, information is removed from Shift Register 54 five bits at a time and the information in the stages shifted either five stages or forty stages between removals, depending upon from which end of Shift Register 54 the information is being removed, which is in turn dependent upon the direction of car travel of the train being scanned.

In the shown embodiment, for an eastbound train the information is removed from the first five stages of Shift Register 54 and the register is shifted forty stages between information removals. This forty stage shift is equivalent of a backward shift of five stages, since the information in the last stage is returned to the first stage through gates 110, 111, and 113. For a westbound train, information is removed from the final five stages of Shift Register 54 and the shift register is advanced five stages between information removals.

Gate 127 receives as its other input a signal on conductor 138, which conductor receives its signal from Print Program 67 (see FIGS. 6 and 12). During the intervals that Print Program 67 is inserting command signals into Tape Punch 62, Print Program 67 provides a negative voltage signal on conductor 138, which signal inhibits gate 127 so as to prevent pulses from Oscillator 57 from being applied to Shift Register 54 during this interval.

Information removed from Shift Register 54 is applied to Tape Punch 62 of FIG. 12 through Code Reverse 61 and cable 151. Code Reverse 61 consists of NOR gates 141 through 150, with gates 141 through 145 receiving the output signals of stages one through five, respectively, of Shift Register 54 and gates 146 through 150 receiving the output signals of stages forty-one through forty-five, respectively, of Shift Register 54. Each of the gates 141 through 145 also has an input terminal connected to conductor 97 and each of the gates 146 through 150 has an input terminal connected to conductor 98. As was previously described, conductor 97 has a negative voltage thereon whenever the system is scanning a westbound train and conductor 98 has a negative signal thereon whenever the system is scanning an eastbound train. Thus, during the punch mode for an eastbound train, the signal on conductor 98 inhibits gates 146 through 150 and the signals stored in the first five stages are passed through gates 141 through 145 and over a suitable cable 151 to Tape Punch 62 of FIG. 12. Conversely, when the system is in the punch mode after scanning a westbound train, the gates 141 through 145 are inhibited by the negative signal on conductor 97 and the output signals stored in the last five stages of Shift Register 54 are applied through gates 146 through 150 and cable 151 to Tape Punch 62.

The five or forty shift pulses to Shift Register 54 are provided as follows: Gates 136 and 137 of FIG. 11 receive input signals from conductors 98 and 97, respectively. These gates are also connected to a binary counter 153 which counts the shift pulses on conductor 115. Counter 153 is a six stage binary counter each stage of which is a flip-flop circuit such as was described at FIG. 5c. The connection of such flip-flop circuits into such a binary counter is well known to those skilled in the art, with such a connection being shown at p. 110 of General Electric's Transistor Manual, 5th ed., so the operation of counter 153 is not further discussed herein.

Gate 136 is connected to counter 153 to provide a negative voltage output signal on conductor 134 after the counter has counted five pulses on conductor 115. Gate 137 is connected to counter 153 to provide a negative voltage output signal on conductor 135 after the counter has counted forty pulses on conductor 115. When the system is in the punch mode after having scanned an eastbound train, a negative voltage is applied over conductor 98 to gate 136, resulting in a zero voltage output of this gate which is applied to one of the input terminals of gate 127 of FIG. 10. At this time, a zero voltage is applied over conductor 97 to one of the input terminals of gate 137, while at least one of the other input signals to gate 137 is a negative voltage until forty pulses have been counted on conductor 115 by counter 153. Thus, gate 137 also supplies a zero voltage output signal to gate 127 and gate 127 passes pulses from Oscillator 57, which pulses pass through gate 128, capacitor 129 and diode 130 to conductor 115, which conductor applies them both to Shift Register 54 as shift pulses and to counter 153 to be counted. When gate 127 has passed forty pulses from Oscillator 57 to conductor 115, counter 153 also applies two zero voltage signals to gate 137, resulting in a negative voltage output signal of this gate which is applied to gate 127 to block subsequent pulses from Oscillator 57.

Conversely, when the system is operating in the punch mode after having scanned a westbound train, gate 137 receives a negative voltage input on conductor 97 and always provides a zero voltage output signal to gate 127 while gate 136 receives a zero voltage input signal on conductor 98 and supplies a zero voltage output signal to gate 127 only until counter 153 has counted five pulses on conductor 115, at which time gate 136 provides a negative voltage signal to gate 127 to block further pulses from Oscillator 57.

With regard to Oscillator 57, in practice it has been found that a pulse oscillator having a repetition rate of about 11,000 cycles per second operates satisfactorily in the system.

Referring now to FIG. 12, Tape Punch 62 receives the output signals of Shift Register 54 over cable 151. Tape Punch 62 is enabled by a signal on conductor 123 from Mode Box 52 at the time Mode Box 52 transfers the system from the scan mode into the punch mode. Tape Punch 52 punches the information received from Shift Register 54 into a paper tape 63 or other suitable form of storage media which may serve as an input to a Teletype transmitter. The punched paper tape 63 is stored in a Tape Storage bin 64 until the Teletype Transmitter 65 can convert the punched tape into Teletype electrical signals, which are transmitted over a line to an office or other point of utilization, at which point a Teletypewriter types the information identifying the vehicles passing the wayside point at which the scanner is located.

Tape Punch 62 provides a negative pulse on conductor 160 as each character is punched into the paper tape 63. This pulse is applied to binary counter 153 of FIG. 11 through gates 161 and 162 to reset counter 153 so as to enable the counter to count the next series of shift pulses to be applied to Shift Register 54. The negative pulse on conductor 160 is also applied to Character Counter 66 which, as was previously described, counts the characters being punched into the paper tape by Tape Punch 62 and instructs Print Program 67, which inserts the previously described command signals into Tape Punch 62 and applies the previously described inhibit signal to gate 127 over conductor 138.

As was previously described, when Character Counter 66 indicates that the punch operation is complete, it provides a pulse to Reset 68, which may again be a conventional one-shot multivibrator, which mechanism provides a negative voltage pulse upon conductor 122. This negative voltage pulse is applied to Character Counter 66 to reset this counter, is applied to Mode Box 52 to transfer the system back into the scan mode and is inverted by NOR gate 163 of FIG. 11 and is applied over conductor 132 to flip-flop 131 of FIG. 10 to set this flip-flop so as to dispose of the initial superfluous pulse provided by Scanner Logic 51 of FIG. 8, as was previously described.

Referring now to FIG. 11 again, in the event that exactly forty-five bits of information are not received from the car identification member 10, Error Check 55 provides a signal to Print Program 67, which in turn gives an indication to Tape Punch 62 that a correct code was not received, as was previously described. Error Check 55 consists of NOR gates 166, 167, 168, 169 and 170 connected as shown, and operates as follows: Gate 166 is connected to counter 153 as shown and provides a zero voltage output signal at all times except after the counter has counted the forty-fifth pulse on conductor 115 and before the counter has counted the forty-sixth pulse. Gate 169 receives as one of its input signals the negative going reset voltage from Reset 68 which transfers the system back into the scan mode of operation. At this time, gate 169 provides a zero voltage output signal which, together with the zero voltage output signal from gate 166 is applied to the inputs of gate 168, which provides a negative voltage output signal from this gate. This negative voltage is applied to one of the other inputs of gate 169 to maintain the output of this gate at zero volts.

If less than forty-five binary numbers are scanned from a car identification member 10, resulting in less than forty-five synchronous trigger pulses being applied to conductor 115, Error Check 55 remains in this state and the zero voltage output signal of gate 169 is inverted by gate 170 and applied over conductor 171 to Print Program 67, commanding the print program to indicate that an incorrect code was received.

If exactly forty-five bits of information are read from a car identification member 10, gate 166 provides a negative voltage output signal and causes a zero voltage output signal from gate 168 to be applied to one of the inputs of gate 169. The remaining input terminal to gate 169 receives the output signal of gate 167, which is connected to counter 153 to provide a negative voltage output signal after the counter counts a forty-sixth pulse on conductor 115. Thus, if exactly forty-five pulses are counted, this gate also has a zero voltage output signal and all input signals to gate 169 are zero volts, resulting in a negative voltage output signal from this gate. This negative voltage is inverted by gate 170 and again applied over conductor 171 to Print Program 67, being a zero voltage at this time and indicating to Print Program 67 that forty-five bits of information were read from the car identification member 10.

If more than forty-five bits of information are so read, gate 167 provides a negative voltage output signal which, when applied to gate 169 results in a zero voltage output signal therefrom. This zero voltage is inverted by gate 170 and applied as a negative voltage over conductor 171 to Print Program 67, which thus again receives an indication that an incorrect code was received. As was previously described, Print Program 67 may then instruct Tape Punch 162 to insert some character, such as the letter "X," in the space which normally appears between the three letters and the six figures of the car identification. Thus, an operator at the central station reading the output of the Teletypewriter receives an indication that a correct code was not received for the particular car.

While the invention is thus disclosed and a specific embodiment described, it is understood that the invention is not limited to this described embodiment. Instead, many modifications and changes will occur to those skilled in the art which lie within the spirit and scope of the invention. It is thus intended that the invention be limited in scope only by the appended claims.

Having thus described the invention, what we claim is:

1. A system for identifying moving railway vehicles passing a wayside point comprising, a source of radiant energy, means for directing radiant energy from said source onto moving railway vehicles passing said wayside point at an angle other than normal to said vehicles, identification members carried by vehicles moving past said wayside point whereby said members are scanned by radiant energy from said source as said vehicles pass said wayside point, each of said members comprising alternately nonreflective and reflective areas and reflecting said radiant energy at substantially the same said angle and in a predetermined code identifying the vehicle carrying said member and indicating the direction of travel of the vehicle carrying said member, means responsive to radiant energy reflected by said member for obtaining a first electrical signal identifying the vehicle carrying said member, means responsive to radiant energy reflected by said member for obtaining a second electrical signal indicative of the direction of travel of the member being scanned, a shift register, means for applying said first electrical signal to said shift register while one of said members is being scanned by said radiant energy, means responsive to said second electrical signal for removing information from said shift register in a first predetermined manner when the member being scanned is traveling in one direction and in a second predetermined manner when said member is traveling in the opposite direction, and means for converting the information removed from said shift register into a form suitable for use as an input to a Teletype communication system.

2. A system for identifying moving railway vehicles passing a wayside point comprising, a source of radiant energy, means for directing radiant energy from said source onto moving railway vehicles passing wayside point at an angle other than normal to said vehicles, identification members carried by vehicles moving past said wayside point whereby said members are scanned by radiant energy from said source as said vehicles pass said wayside point, said members comprising alternately nonreflective and reflective areas and reflecting said radiant energy at substantially the same said angle and in a predetermined code capable of identifying the vehicle carrying said member as well as indicating the direction of travel of the vehicle carrying said member, means responsive to radiant energy reflected by said member for obtaining a first electrical signal identifying the vehicle carrying said member, means responsive to radiant energy reflected by said member for obtaining a second electrical signal indicative of the direction of travel of the member being scanned, a shift register, means for applying said first electrical signal to said shift register while one of said members is being scanned by said radiant energy, means responsive to said second electrical signal for removing information from said shift register in a first predetermined manner when the member being scanned is traveling in one direction and in a second predetermined manner when said member is traveling in the opposite direction, said last mentioned means including means for applying a first predetermined number of shift pulses to said shift register during the interval between scanning said members when the member being scanned is traveling in one direction and a second predetermined number of shift pulses to said shift register during the interval between scanning said members when the member being scanned is traveling in the opposite direction, and means for converting the information removed from said shift register into a form suitable for use as an input to a Teletype communication system.

3. A system for identifying moving railway vehicles passing a wayside point comprising, a source of infrared radiant energy, means for directing infrared radiant energy from said source onto moving objects passing said wayside point at an angle other than normal to said vehicles, identification members carried by vehicles moving past said wayside point whereby said members are scanned by infrared radiant energy from said source as said vehicles pass said wayside point, each of said members comprising alternately nonreflective and reflective areas and reflecting said infrared radiant energy at substantially the same said angle and in a predetermined code capable of identifying the vehicle carrying said member as well as indicating the direction of travel of the vehicle carrying said member, means responsive to infrared radiant energy reflected by said member for obtaining a first electrical signal identifying the vehicel carrying said member, means responsive to infrared radiant energy reflected by said member for obtaining a second electrical signal indicative of the direction of travel of the member being scanned, a shift register, means for applying said first electrical signal to said shift register while one of said members is being scanned by said infrared radiant energy, means responsive to said second electrical signal for removing information from said shift register in a first predetermined manner when the member being scanned is traveling in one direction and in a second predetermined manner when said member is traveling in the opposite direction, and means for converting the information removed from said shift register into a form suitable for use as an input to a Teletype communication system.

4. A system for identifying moving railway vehicles passing a wayside point comprising, a source of infrared radiant energy, means for directing infrared radiant energy from said source onto moving railway vehicles passing said wayside point at an angle other than normal to said vehicles, identification members carried by vehicles moving past said wayside point whereby said members are scanned by infrared radiant energy from said source as said vehicles pass said wayside point, each of said members having alternately coded nonreflective portions and retroreflective portions for reflecting said infrared radiant energy back towards said source at substantially the same said angle and in a predetermined code which is adapted to identify and indicate the direction of travel of the vehicle carrying said member, means responsive to infrared radiant energy reflected by said member for obtaining a first electrical signal identifying the vehicle carrying said member, means responsive to infrared radiant energy reflected by said member for obtaining a second electrical signal indicative of the direction of travel of the member being scanned, a shift register, means for applying said first electrical signal to said shift register while one of said members is being scanned by said infrared radiant energy, means responsive to said second electrical signal for removing information from said shift register in a first predetermined manner when the member being scanned is traveling in one direction and in a second predetermined manner when said member is traveling in the opposite direction, said last mentioned means including means for applying a first predetermined number of shift pulses to said shift register during the interval between scanning said members when the member being scanned is traveling in one direction and a second predetermined number of shift pulses to said shift register during the interval between scanning said members when the member being scanned is traveling in the opposite direction, and means for converting the information removed from said shift register into a form suitable for use as an input to a Teletype communication system.

References Cited

UNITED STATES PATENTS 3,117,754   1/1964   Morganstern ____ 235—61.11 X

DARYL W. COOK, Primary Examiner

U.S. Cl. X.R.

246—2